United States Patent
Nicolas et al.

(10) Patent No.: US 10,652,019 B1
(45) Date of Patent: May 12, 2020

(54) ATOMIC SWAP USING ZERO-KNOWLEDGE PROOFS, AND APPLICATIONS THEREOF

(71) Applicant: QED-IT SYSTEMS LTD., Tel Aviv-Jaffa (IL)

(72) Inventors: Aurélien Renaud François Nicolas, Berlin (DE); Ron Kahat, Tel Aviv (IL); Pablo Kogan, Ramat Gan (IL); Yakov Gurkan, Netanya (IL); Ori Wallenstein, Raanana (IL)

(73) Assignee: QED-IT SYSTEMS LTD., Tel Aviv-Jaffa (IL)

( * ) Notice: Subject to any disclaimer, the term of this patent is extended or adjusted under 35 U.S.C. 154(b) by 0 days.

(21) Appl. No.: 16/554,219

(22) Filed: Aug. 28, 2019

(51) Int. Cl.
*H04L 29/06* (2006.01)
*H04L 9/08* (2006.01)
*H04L 9/30* (2006.01)

(52) U.S. Cl.
CPC ............... *H04L 9/088* (2013.01); *H04L 9/30* (2013.01)

(58) Field of Classification Search
CPC ..................................................... H04L 9/088
See application file for complete search history.

(56) References Cited

U.S. PATENT DOCUMENTS

| | | | | |
|---|---|---|---|---|
| 2005/0010535 A1* | 1/2005 | Camenisch | ............ | G06Q 20/02 705/74 |
| 2010/0142704 A1* | 6/2010 | Camenisch | ........... | H04L 9/0847 380/44 |
| 2011/0060903 A1* | 3/2011 | Yoshida | ................. | H04L 9/302 713/155 |
| 2017/0093906 A1 | 3/2017 | Bhargav-Spantzel | | |
| 2017/0278100 A1 | 9/2017 | Kraemer et al. | | |

(Continued)

FOREIGN PATENT DOCUMENTS

| | | |
|---|---|---|
| CN | 108418689 A | 8/2018 |
| CN | 108764874 A | 11/2018 |

OTHER PUBLICATIONS

Simmons, Gustavus J., and George B. Purdy. "Zero-knowledge proofs of identity and veracity of transaction receipts." Workshop on the Theory and Application of of Cryptographic Techniques. Springer, Berlin, Heidelberg, 1988. (Year: 1988).*

(Continued)

*Primary Examiner* — Shawnchoy Rahman
(74) *Attorney, Agent, or Firm* — Sterne, Kessler, Goldstein & Fox P.L.L.C.

(57) ABSTRACT

Disclosed herein are system, method, and computer program product embodiments for performing transactions or atomic swaps using zero-knowledge proofs ("ZKPs"). A first system may propose a transaction between with a second system. The first system may generate a first ZKP indicating that the first system has possession of an asset desired by the second system and that the first system is committing the asset to the transaction. The second system may also similarly generate a second ZKP. These ZKPs may be encrypted and exchanged. The second system may receive an encrypted version of the first ZKP, perform a decryption using a key specific to the second system, and verify the ZKP. When the parties verify the ZKPs, this confirms that each party has committed the requested asset and that the transaction may proceed. The transaction may be committed to a blockchain.

17 Claims, 7 Drawing Sheets

(56) References Cited

U.S. PATENT DOCUMENTS

2017/0366358 A1* 12/2017 Lyubashevsky ...... H04L 9/3255
2019/0229919 A1* 7/2019 Gurkan ................. H04L 9/0869

OTHER PUBLICATIONS

Zero-knowledge atomic cross-blockchain swaps—feedback requested / peer review, Apr. 8, 2016, 7 pages, accessed on Aug. 22, 2019, website: https://www.reddit.com/r/Bitcoin/comments/4dum58/zeroknowledge_atomic_crossblockchain_swaps/.
Rami Khalil, et al, "TEX—A Securely Scalable Trustless Exchange", Mar. 5, 2019, 17 pages, website: https://eprint.acr.org/2019/265.pdf.
Aziz, Guide to Atomic Swaps: What are Atomic Swaps & How Does it Work?, Sep. 15, 2017, accessed on Aug. 22, 2019, website: https://masterthecrypto.com/guide-to-atomic-swaps-what-are-atomic-swaps/.
Search Report and Written Opinion from Intellectual Property Office of Singapore directed to related International Patent Application No. 10201903150Q, dated May 17, 2019, 9 pages.

\* cited by examiner

ATOMIC SWAP USING ZERO-KNOWLEDGE PROOFS, AND APPLICATIONS THEREOF

BACKGROUND

Field

This field is generally related to cryptography, zero-knowledge proofs, and blockchain technology.

Related Art

When information or data is exchanged between parties, the question of whether the information can be trusted arises. A party receiving information may question whether the received information is truthful. For example, the party receiving the information may wish to verify that the information received is accurate and that the sending party has not fabricated false information. Further, the receiving party may wish to verify that a third-party has not tampered with the received information.

In some cases, the sending party may wish to deliver information to the receiving party without exposing private underlying data used to generate the information. For example, the sending party may wish to report an average temperature measurement but may not wish to expose the individual sensor measurements from each temperature sensor. In this manner, the sending party may wish to use a mechanism that proves that the reported average temperature measurement sent to the receiving party used all of the sensor measurements and also applied the proper formula for calculating the average. One way of ensuring privacy while verifying accuracy is using a zero-knowledge proof ("ZKP").

In other words, a party may compute a function on data that it wants to keep confidential and share the result of the function with another party. The ZKP allows a party to verify that the function was properly applied to the data, without having to share the data itself. This allows the other party to verify the integrity of the function and the accuracy of the result without knowing the underlying data. One example of a ZKP is the zero-knowledge succinct non-interactive argument of knowledge ("zk-SNARK").

The issue of trust also arises in performing transactions between parties. For example, in the area of cryptocurrency, parties would like to trust that transaction parameters are accurate before executing a transaction. For example, parties would like to ensure that they do not execute a transaction with another party that could renege on promises or refuse to exchange promised assets. Parties would like to avoid the typical, two-transaction scenario where a first party delivers assets to a second party and hopes that the second party will complete its end of the transaction in a timely manner if at all.

To deal with this issue, conventional methods of settlement often involve placing the assets in an escrow. The escrow account may lock the assets up or prematurely commit the assets without an assurance that a transaction will be executed. This may result in missed opportunities and can slow down transaction processing.

Improved systems and methods are needed to process transactions electronically that speed up and avoid locking while assuring integrity of the transaction.

BRIEF SUMMARY

Disclosed herein are system, apparatus, device, method and/or computer program product embodiments, and/or combinations and sub-combinations thereof, for performing atomic swaps using zero-knowledge proofs.

In an embodiment, an atomic swap system may facilitate transactions between two systems. The atomic swap system may use zero-knowledge proofs ("ZKPs") to provide trustable information while maintaining confidentiality using encrypted proof results. The atomic swap system is able to provide verification that parties are able to provide assets in a transaction using ZKPs and that the parties actually commit the agreed upon assets. These assets may be physical assets, such as goods, products, art, as well as securities including bonds, insurance policies, titles to assets, currency, or cryptocurrency.

In some embodiments, a computer-implemented method for executing transactions using zero-knowledge proofs may include receiving a command identifying a proposed transaction between a first and a second system. The proposed transaction may be an exchange of a first asset with a second asset, wherein the first system has requested to receive the second asset and the second system has requested to receive the first asset. A first zero-knowledge proof may be generated proving that the first system is able to transfer the first asset. The first zero-knowledge proof may be encrypted in a first message. This encryption may occur with a first key such that only the second system can read the first message. The first message is then transmitted to the second system where a second encrypted message is generated. The second encrypted message includes a second zero-knowledge proof proving that the second system is able to transfer the second asset and wherein the second message is encrypted by a second key such that only the first system can read the second message. A confirmation message may also be received from the second system indicating that the second system has verified the first zero-knowledge proof. In response to the confirmation message and verification of the second zero-knowledge proof, the proposed transaction may be executed.

In some embodiments, a first system for executing transactions using zero-knowledge proofs may comprise a memory and at least one processor coupled to the memory. The processor may be configured to receive a command identifying a proposed transaction between a first and a second system. The proposed transaction is an exchange of a first asset with a second asset. The first system has requested to receive the second asset in exchange for the first asset, and the second system has requested to receive the first asset in exchange for the second asset. The processor may generate a first zero-knowledge proof proving that the first system is able to transfer the first asset. The processor encrypts the first zero-knowledge proof in a first message. This encryption occurs with a first key such that only the second system can read the first message. The processor then transmits the first message to the second system where a second encrypted message is generated. The second encrypted message includes a second zero-knowledge proof proving that the second system is able to transfer the second asset and wherein the second message is encrypted by a second key such that only the first system can read the second message. The processor may also receive a confirmation message from the second system indicating that the second system has verified the first zero-knowledge proof. In response to the confirmation message and verification of the second zero-knowledge proof, the processor executes the proposed transaction may be executed.

In some embodiment, a non-transitory computer-readable device is disclosed, the non-transitory computer-readable device may have instructions stored thereon that, when executed by at least one computing device, may cause the at least one computing device to perform the computer-implemented method described above.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1A:
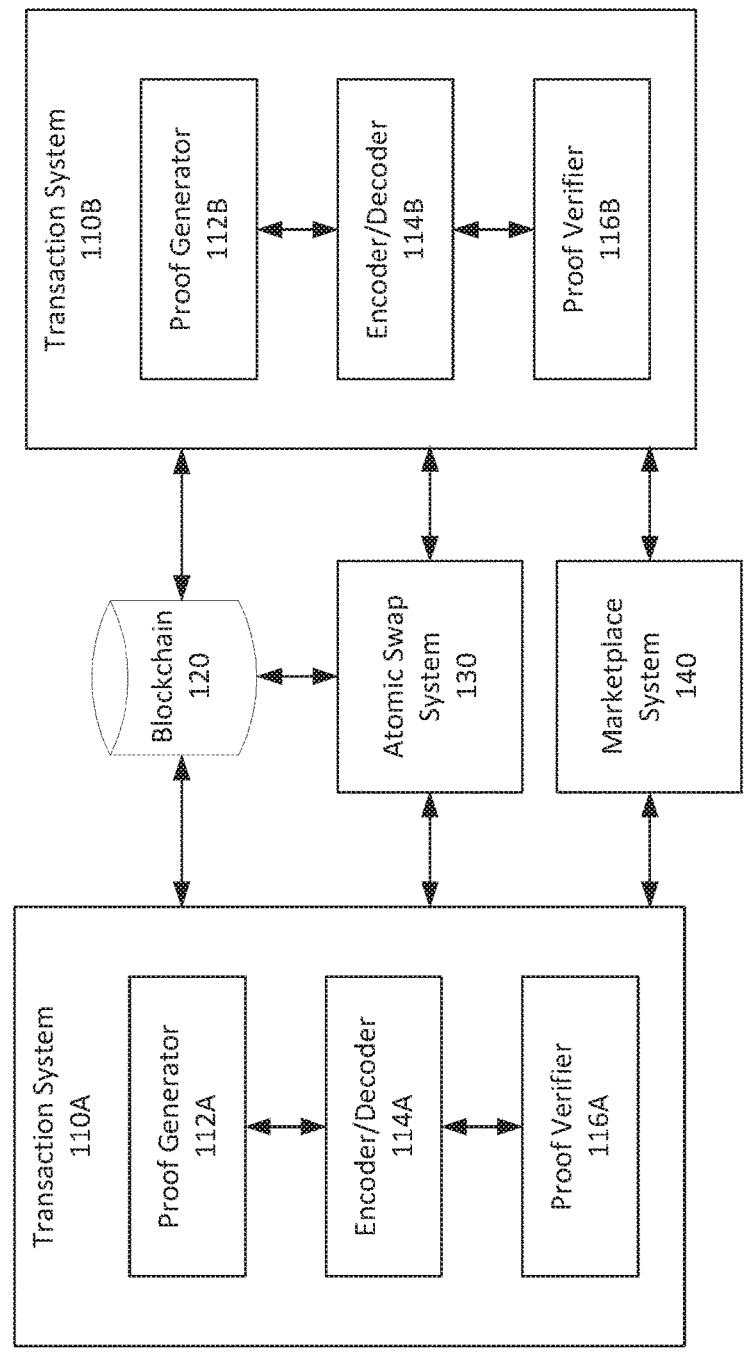
FIG. 1A depicts a block diagram of a transaction environment including an atomic swap system, according to some embodiments.

Provided herein are system, apparatus, device, method and/or computer program product embodiments, and/or combinations and sub-combinations thereof, for performing atomic swaps using zero-knowledge proofs.

In an embodiment, an atomic swap system may facilitate transactions between two systems. The atomic swap system may use zero-knowledge proofs ("ZKPs") to provide trustable information while maintaining confidentiality using encrypted proof results. The atomic swap system is able to provide verification that parties are able to provide assets in a transaction using ZKPs and that the parties actually commit the agreed upon assets. These assets may be physical assets, such as goods, products, art, as well as securities including bonds, insurance policies, currency, or cryptocurrency.

Using ZKPs further allows parties to perform atomic swaps, reducing the two-transaction scenario to a one-transaction scenario or a single transaction scenario. The atomic swap system allows an exchange to occur after the parties have verified the asset possession of the other party and that the asset is actually provided in the transaction. In this case, a first party is able to execute the transaction transferring a first asset after confirming that a second party will complete the transaction and deliver to the first party a second asset corresponding to the second party in exchange for the first asset. This exchange of first and second assets may occur simultaneously or within a short period of time. By performing this exchange, or swap, the atomic swap system allows the first and second parties to avoid delays. Also, reducing the swap from a two-transaction to one-transaction scenario may improve processing speeds for asset transactions. Further, the atomic swap system prevents a party from altering the terms of an agreement or not providing the promised asset or asset quantity.

In contrast to traditional clearing and settlement techniques, the atomic swap system does not require that the parties commit or lock assets prior to the other party's completion of the transaction. For example, parties need not deposit assets into an escrow account. This ability to avoid locking assets may allow parties to make multiple offers to multiple parties. The multiple threading capability may allow for parallel processing and/or may process potential transactions in a distributed manner. Using the ZKPs generated at the time of transaction, parties are able to keep assets and confirm possession of the assets with the other party before executing the transaction. In this manner, even with many pending offers, parties are able to confirm that other parties will be able to fulfill transaction obligations and complete the transfer of a promised asset because of a verification process that occurs shortly before a transaction is completed.

In an embodiment, to execute an atomic swap using ZKPs, two systems may initiate a transaction. For example, the two systems may use a marketplace system or exchange to formulate the transaction. The transaction may require a first party to transfer a first asset to a second party and for the second party to transfer a second asset to the first party. Example transactions may include exchanging currency for a token representing a physical asset or product, exchanging securities, and/or other types of transactions. In an embodiment, the assets may include data files or information. The assets in the transaction may be of the same type or different types of assets.

Once the two systems have agreed to a transaction as well as the terms of the transaction (i.e., what each system expects to receive as well as provide), both systems may provide transaction parameters to the atomic swap system. Using these parameters, the atomic swap system may generate corresponding proofs to illustrate that the systems have possession of their corresponding assets. The atomic swap system may then encrypt these proofs using specific keys corresponding to the other system. For example, if a first system is attempting to transfer a first asset to the second system, the atomic swap system may receive transaction parameters, such as an asset note, indicating that the first system has possession of the first asset and is committing the first asset to the transaction. The atomic swap system may then generate a ZKP indicating that the first system has possession of the first asset and is committing the first asset to the transaction. The atomic swap system may then encrypt the ZKP using a cryptographic key corresponding to the second system and generate an encrypted data packet. In an embodiment, this encryption may occur during the formulation of the ZKP. Because of this encryption, only the second system will be able to decrypt the data packet and view the ZKP. Viewing and/or verifying the ZKP may allow the second system to confirm that the first system has actually provided the promised first asset. In this manner, the second system may provide a confirmation message upon verification.

The atomic swap system may perform these same operations with the first system. That is, the second system may provide parameters to generate a ZKP, and the first system may confirm that the second system has committed the second asset to the transaction. Once the atomic swap system has received confirmation messages from both systems, the atomic swap system may perform an atomic swap by transferring the assets and recording the transaction. In an embodiment, this transaction may be recorded on a blockchain. For example, the transaction may involve securities or currency and the blockchain may be a ledger of transactions. In a non-limiting example, a first system may provide $100 to a second system in exchange for a bond from the second system.

While the atomic swap process may be performed by an atomic swap system independent from a first system and a second system performing a transaction, in an embodiment, the atomic swap and ZKP process may be performed directly between the first system and the second system without an intermediary system. For example, the first system and the second system may generate their own ZKPs confirming the transaction terms and cryptographically transfer the ZKPs to the other system. Upon verification, the first and second systems may perform the swap of assets. The systems may also record the transaction on a blockchain.

Various embodiments of these features will now be discussed with respect to the corresponding figures.

FIG. 1A depicts a block diagram of a transaction environment 100A including an atomic swap system 130, according to some embodiments. Transaction environment 100A may include transaction system 110A and transaction system 110B. While two transaction systems 110 are depicted in FIG. 1A, other transaction systems 110 may communicate and perform transactions. A transaction system 110 may include one or more processors, memory, servers, routers, modems, and/or antennae configured to interface with atomic swap system 130, marketplace system 140, and/or blockchain 120. The transaction systems 110 may communicate with atomic swap system 130, marketplace system 140, and/or blockchain 120 via a local area network (LAN), a wireless network, and/or via the Internet. A transaction system 110 may provide transaction data or parameters to atomic swap system 130, interface with marketplace system 140, and/or commit data to blockchain 120 via blocks.

The transaction systems 110 may be used by different users, parties, or entities to perform transactions. For example, transaction system 110A may propose a transaction involving an exchange of assets with transaction system 110B. This proposal may occur as communications and/or messaging between transaction system 110A and transaction system 110B. This example embodiment is further described with reference to FIG. 1B.

In an embodiment, transaction system 110A may propose a transaction and/or identify a proposed transaction using marketplace system 140. Marketplace system 140 may be an exchange accessible via the Internet. For example, marketplace system 140 may be a host server and/or may host a website. Marketplace system 140 may allow transaction systems 110 to post offers for asset transactions, view or retrieve posted offers, and/or may send notifications to transaction systems 110 related to asset offers. Marketplace system 140 may allow for messages to be exchanged between transactions systems 110, which may include counteroffers and/or modifications to proposed transactions. Using marketplace system 140, transaction systems 110 may formulate agreed terms for proposed transactions.

Marketplace system 140 may share, wholly or partially, the same software and/or hardware as atomic swap system 130 and/or blockchain 120. While FIG. 1A depicts these systems separately, the systems may be combined and/or implemented using overlapping software and/or hardware, such as computer system 500 as described with reference to FIG. 5.

Atomic swap system 130 may generate and/or encrypt zero-knowledge proofs (ZKPs) verifying that a particular transaction system 110 is in possession of assets required for the proposed transaction and is committing those assets as part of the proposed transaction. This ZKP may be referred to as a "spend proof" and may indicate that an asset is available and has not already left the possession of transaction system 110. For example, the ZKP may indicate possession and commission of a type of asset (or asset identification), a quantity of the asset, and/or authorization to provide the asset. For example, if a first party has agreed to exchange a first asset for a second asset in possession on the second party, the first party may use transaction system 110A to provide transaction parameters to atomic swap system 130. These transaction parameters may include an identification or ID identifying the deal or transaction, a parameter indicating conditions that would cause a termination of the deal, the other party's payment address, the other party's mailbox identification (such as a topic or a queue), the providing party's desired asset type, value, and/or quantity, and/or the other party's desired asset type, value, and/or quantity. Atomic swap system 130 may receive these parameters from each transaction system 110 participating in a transaction. In this manner, atomic swap system 130 may identify the assets requested by a first transaction system 110 as well as the assets requested by a second transaction system 110B. Atomic swap system 130 may execute multiple transactions and receive parameters from multiple transaction systems 110 participating in different transactions. The transactions may also include one or more assets and/or different asset quantities from the transaction systems 110.

Atomic swap system 130 may receive transaction parameters from transaction system 110A and/or transaction system 110B. Atomic swap system 130 may receive these parameters after the parties have agreed to the terms of a proposed transaction. In an embodiment, atomic swap system 130 may have monitored the negotiation of the transaction terms in order to identify these parameters. For example, if atomic swap system 130 and marketplace system 140 share components and/or are communicating, marketplace system 140 may provide these parameters to atomic swap system 130.

The parameters received from the transaction systems 110 may include ZKPs and/or data allowing atomic swap system 130 to generate a ZKP. The ZKP may act as verification that a particular transaction system 110 has possession of assets and is committing those assets as part of the transaction. In an embodiment, the transaction system 110 may generate a ZKP internally using proof generator 112. A zero-knowledge proof may be a protocol or function applied to underlying data to indicate that the underlying data is true without revealing the underlying data itself. The result generated from the ZKP process may allow a verifier to verify that a statement provided by the prover is true. The ZKP may be used to prove whether a particular transaction system 110 is the particular asset that has been requested by the other transaction system 110 while still maintaining confidentiality and without requiring the transaction system 110 to provide the asset as proof.

For example, if the transaction requires transaction system 110A to provide a particular number of units of cryptocurrency, the ZKP may prove that a cryptocurrency wallet corresponding to transaction system 110A contains sufficient funds to complete the transaction as well as proof that transaction system 110A is committing the particular number of units to the transaction. Committing a fewer number of units would result in an invalid ZKP when verified by the other party. In this manner, the other party may trust that the other party is truly committing the agreed-upon asset and asset quantity. Atomic swap system 130 and/or the ZKP process provides this confidence because an input to generating a ZKP is what the other party has requested in the transaction.

Through using the ZKP process before actually transferring assets, confidence is ensured while avoiding the premature transfer of assets. For example, a party is able to view a ZKP from the other party before actually transferring assets to the other party or locking the assets in an escrow. In an embodiment involving cryptocurrency, the ZKP may prove that funding from the transaction system 110A is sufficient and is committed to the transaction without necessarily providing transaction system 110B with the quantity of cryptocurrency in a wallet corresponding to transaction system 110A and/or without requiring transaction system 110A to lock or escrow the amount prior to completing the transaction. Transaction system 110A may generate the ZKP and/or provide parameters or underlying data to atomic swap system 130 so that atomic swap system 130 is able to generate the ZKP.

After receiving the transaction parameters from either transaction system 110A and/or 110B, atomic swap system 130 may generate an unsigned transaction data structure and/or a transaction metadata that may be used to sign the unsigned transaction data structure using the provided parameters. The unsigned transaction data structure may be private data referred to as an "asset note," which may include the ZKP generated by transaction system 110A or atomic swap system 130. The asset note may be a data structure generated using private or public keys corresponding to particular transaction systems 110, a payment address corresponding to particular transaction systems 110, the asset types being exchanged, and/or the asset values or quantities to be exchanged. Atomic swap system 130 may save the asset note and/or the transaction metadata in a memory such as, for example, a database.

When two parties or two transaction systems 110 are participating in a transaction, atomic swap system 130 may generate two ZKPs: one for each transaction system 110. A first ZKP may be generated to prove that transaction system 110A is able to provide a first asset to transaction system 110B and has committed the first asset to the transaction. The first ZKP is generated with an input parameter indicating that transaction system 110B has requested the first asset (and/or a quantity of the first asset). A second ZKP may be generated to prove that transaction system 110B is able to provide a second asset to transaction system 110A. Similarly, the second ZKP may be generated using the requesting information from transaction system 110A (i.e., the second asset and/or a quantity of the second asset). These ZKPs may be included in an asset note that may be transmitted to the other transaction system 110 so that the receiving party is able to verify that the sending party is able to complete the transaction by committing the requested assets.

When two parties or two transaction systems 110 are participating in a transaction, the parties may provide public keys to atomic swap system 130. For example, transaction system 110A may provide a first public key corresponding to transaction system 110A. Similarly, transaction system 110B may provide a second public key corresponding to transaction system 110B. After receiving the parameters and/or the asset notes for the transaction between transaction systems 110A and 110B, atomic swap system 130 may encrypt the asset notes with the corresponding public key. For example, a first asset note including a ZKP proving that transaction system 110A is committing a requested first asset to the transaction may be encrypted using a public key corresponding to transaction system 110B. In this manner, only transaction system 110B may decrypt the data packet and access the asset note. Atomic swap system 130 may perform this operation for an asset note originating from transaction system 110B to transaction system 110A using a public key corresponding to transaction system 110A. Upon performing this encryption, atomic swap system 130 may transmit the corresponding encrypted asset notes to the corresponding transaction system 110.

In an embodiment, the transaction systems 110 may perform their own encryption similar to generating their own ZKPs. As will be further described with reference to FIG. 1B, transaction systems 110 may perform their own encryption in scenarios where the transaction systems 110 perform a transaction directly without an intermediary atomic swap system 130. To perform their own encryption, the transaction systems 110 may use encoder/decoder 114. The transaction systems 110 may perform the encoding in a manner similar to that described with reference to atomic swamp system 130 by using the other party's public key. For example, transaction system 110A may encode the asset note and/or ZKP using a public key corresponding to transaction system 110B. Transaction system 110A may then transmit the encrypted asset note to transaction system 110B.

After a transaction system 110B has received an encrypted asset note either from atomic swap system 130 or transaction system 110A, transaction system 110B may decrypt the encrypted asset note. Encoder/decoder 114 may perform the decryption. Transaction system 110A may perform the same operation on an encrypted asset note corresponding to an asset provided by transaction system 110B. Transaction system 110B may use its corresponding key to perform the decryption. If the decryption fails, the verifying transaction system 110 may identify this issue as a potential error. The error could have occurred during delivery or receipt. In an embodiment, the provided encrypted asset note may have experienced tampering. For example, a malicious system may have attempted to provide a false asset note. The failure of the decryption may indicate this potential attack.

If decryption is successfully performed at encoder/decoder 114, the corresponding transaction system 110 may retrieve the asset note and perform a verification function. This verification function may verify the ZKP provided by the other party and may be performed by proof verifier 116. Proof verifier 116 verifies that the other party has committed the requested asset to the transaction. For example, if transaction system 110B has requested $100 from transaction system 110A in exchange for a bond, proof verifier 116 may verify that transaction system 110A has actually committed this amount. Transaction system 110B may use the parameters of the transaction, including the amount requested, in a verification function to confirm the intended result. In an embodiment, this verification may include recomputing a hash value to determine that the correct assets and/or asset quantity have been committed.

For example, the verification function may use a signature corresponding to transaction system 110B to verify the received ZKP. If the result of the verification function is an expected result in view of the requested assets, then transaction system 110B is able to confirm that transaction system 110A has committed the requested asset and/or asset quantity to the transaction. If the result of the verification function is not the expected result, however, transaction system 110B may identify the verification attempt as a failure. This failure may represent transaction system 110A committing an asset or asset quantity differing from the agreed upon terms of the transaction. In this case, transaction system 110B may reject the transaction because transaction system 110B has detected that transaction system 110A has not committed the requested asset or asset quantity.

In the case where both transaction systems 110 are able to verify their received asset notes and ZKPs, the parties may both agree to confirm the transaction. Confirmation of the transaction may result in the exchange of the assets and/or an atomic swap of the assets. Upon agreement by both transaction systems 110, one or both transaction systems 110 may apply one or more signatures corresponding to the transaction systems 110 to encode the transaction. In an embodiment, transaction system 110A may sign the transaction with a signature corresponding to transaction system 110B. A transaction system 110 and/or atomic swap system 130 may then publish the encoded transaction on blockchain 120. Both transaction systems 110 need not commit the transaction on blockchain 120, but in some embodiments, both transaction systems 110 may commit the transaction. Because the transaction has been encoded using one or more signatures, the transaction may remain encoded on blockchain 120 even if the transaction is viewable by others.

In an embodiment, logic may specify the transaction system 110 that commits the transaction to blockchain 120, such as, for example, the transaction system 110 having the higher address. In an embodiment, a transaction system 110A may be tasked with committing the transaction. If an amount of time elapses and the transaction has not been committed, the logic may specify that transaction system 110B commit the transaction.

In this manner, the ZKP elements used by the transaction system 110 and/or by atomic swap system 130 may allow parties to confirm that other parties are committing the requested assets to a particular transaction. This confirmation is possible without using an escrow or locking asset before a transaction is ready to be executed. Further, the structure of the ZKP allows each party to confirm that specified assets and/or asset quantities are committed to the transaction by the other party. By including the requested asset information in the ZKP, parties may be able to detect if the other parties attempt to provide an incorrect asset or incorrect asset quantity. In this manner, using ZKPs provide enhanced confidence in the transactions and allow users to confirm transactions and transaction expectations before committing assets to a transaction or to a blockchain 120.

Figure 1B:
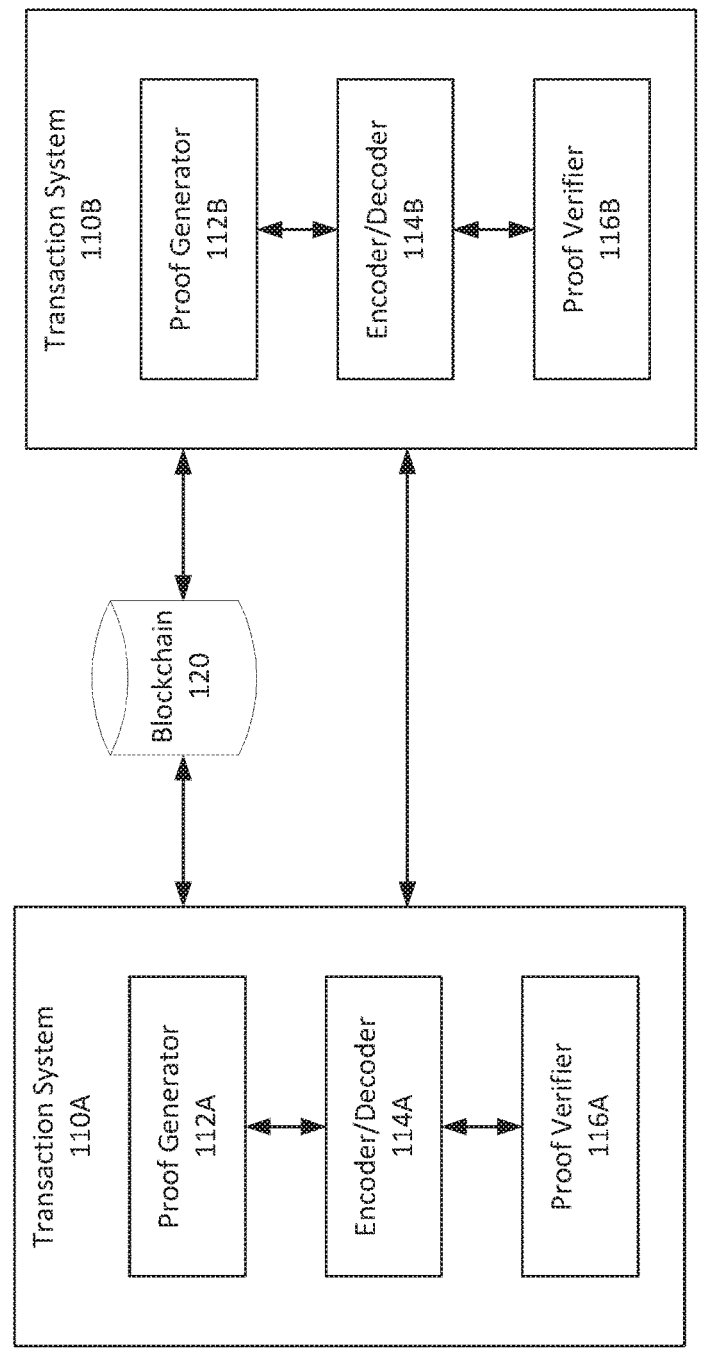
FIG. 1B depicts a block diagram of a transaction environment with direct transactions, according to some embodiments.

FIG. 1B depicts a block diagram of a transaction environment 100B with direct transactions, according to some embodiments. As previously described, transaction environment 100B may include transaction system 110A and transaction system 110B. The transaction systems 110 may directly communicate in a decentralized manner without an intermediary system. For example, the transactions systems 110 may exchange messages to negotiate a transaction, to exchange encrypted asset notes, and/or to provide confirmation after verifying a received ZKP. After the transaction systems 110 have confirmed the ZKPs, a transaction system 110 may commit the transaction to blockchain 120.

In an embodiment, transaction systems 110 may negotiate a transaction without using a marketplace system 140. For example, the transaction systems 110 may exchange messages to negotiate a transaction. The messages may represent offers and/or counteroffers so that the parties are able to agree upon transaction terms or parameters. In this manner, transaction system 110A may agree to the assets requested by transaction system 110B and vice versa.

Because both parties have identified the assets requested by the other party, both parties will be expected to commit the types of assets requested as well as the correct quantity of assets requested. To prove this commitment, each transaction system 110 may generate their own respective ZKPs. The transaction systems 110 may use a proof generator 112 which may generate the proofs. The proof generator 112 may generate the proofs in a manner similar to atomic swap system 130 as described with reference to FIG. 1A. The ZKPs may be generated using the asset or asset quantities that the transaction systems 110 expect to receive. In this manner, the transaction systems 110 are prevented from altering the assets or asset quantities that are committed to the transaction.

If the transaction systems 110 are performing the verification process, the transaction systems 110 may generate asset notes using the ZKPs. The transaction systems 110 are then able to encrypt the asset notes using a key corresponding to the other transaction system 110 using encoder/decoder 114. For example, transaction system 110A may encrypt the asset note using a key corresponding to transaction system 110B using encoder/decoder 114A. In this manner, transaction system 110B may be the only system capable of decrypting the encrypted asset note. Transaction system 110B may also encrypt an asset note in a similar manner.

After encrypting the asset notes, the transaction systems 110 may transmit the encrypted asset notes to the other transaction system 110. Using encoder/decoder 114, the transaction systems may decrypt the received encrypted asset notes using their respective keys. Decrypting the encrypted asset notes may allow the transaction systems 110 to apply proof verifier 116 to verify the ZKPs. Verifying the ZKPs may occur in a manner similar to the verification described with reference to FIG. 1A. The transaction systems 110 may ensure that the other transaction system 110 has committed the requested asset and/or asset quantity to the transaction. If a failure occurs during the verification of the ZKP, the transaction system 110 may detect that the other transaction system has not committed the requested assets and/or asset quantities.

If the verification of the ZKP succeeds, however, the transaction systems 110 may identify that the other transaction system 110 has committed the requested assets and/or asset quantities. Subsequently, the transaction systems 110 may exchange confirmation messages to indicate that the ZKPs have been verified. In view of this confirmation, the transaction systems 110 may execute the transaction and transfer assets. A transaction system 110 may commit the transaction to blockchain 120.

While the configuration depicted in transaction environment 100B does not use a marketplace system 140 or a centralized atomic swap system 130, the confidentiality and verification benefits still may be used by the transaction systems 110. In this manner, the transaction systems 110 are able to verify proofs and to ensure that the other transaction system 110 has committed the requested assets to the transaction. This configuration allows the party to confirm the assets committed without using a third-party system and/or without using an escrow to perform clearing and settlement.

Figure 1C:
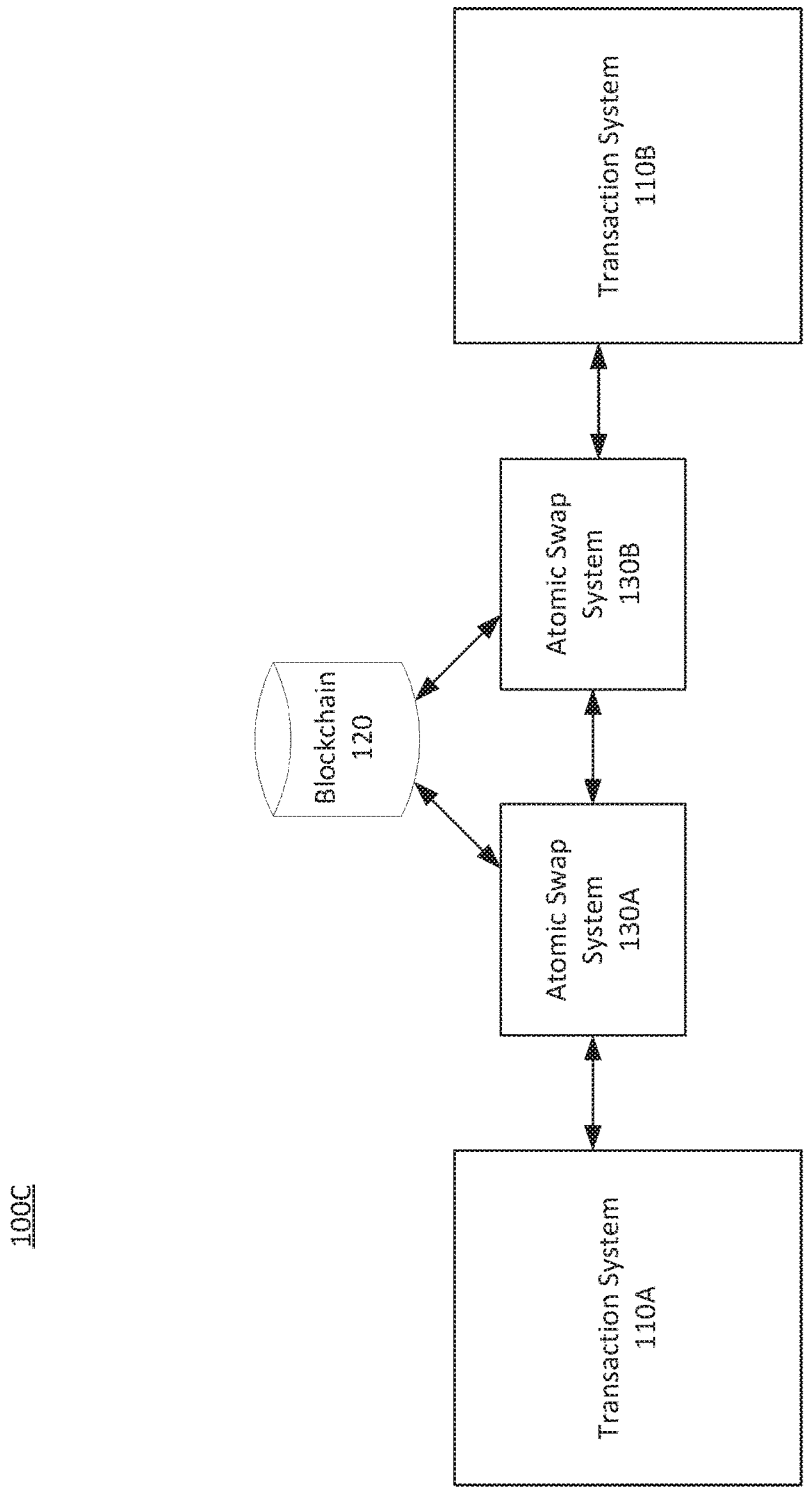
FIG. 1C depicts a block diagram of a transaction environment with dedicated atomic swap systems, according to some embodiments.

FIG. 1C depicts a block diagram of a transaction environment 100C with dedicated atomic swap systems 130A, 130B, according to some embodiments. In transaction environment 100C, the transaction systems 110 may employ their own respective atomic swap systems 130A, 130B to perform the ZKP generation and/or encryption. For example, transaction system 110A may use a first atomic swap system 130A while transaction system 110B may use a second atomic swap system 130B. In this manner, the two atomic swap nodes 130A, 130B may communicate to perform the ZKP generation, encryption, signature, verification, and/or committing the transaction to blockchain 120. These operations may occur in a manner similar to those described with reference to FIG. 1A and FIG. 1B. This configuration may also be decentralized.

Figure 2:
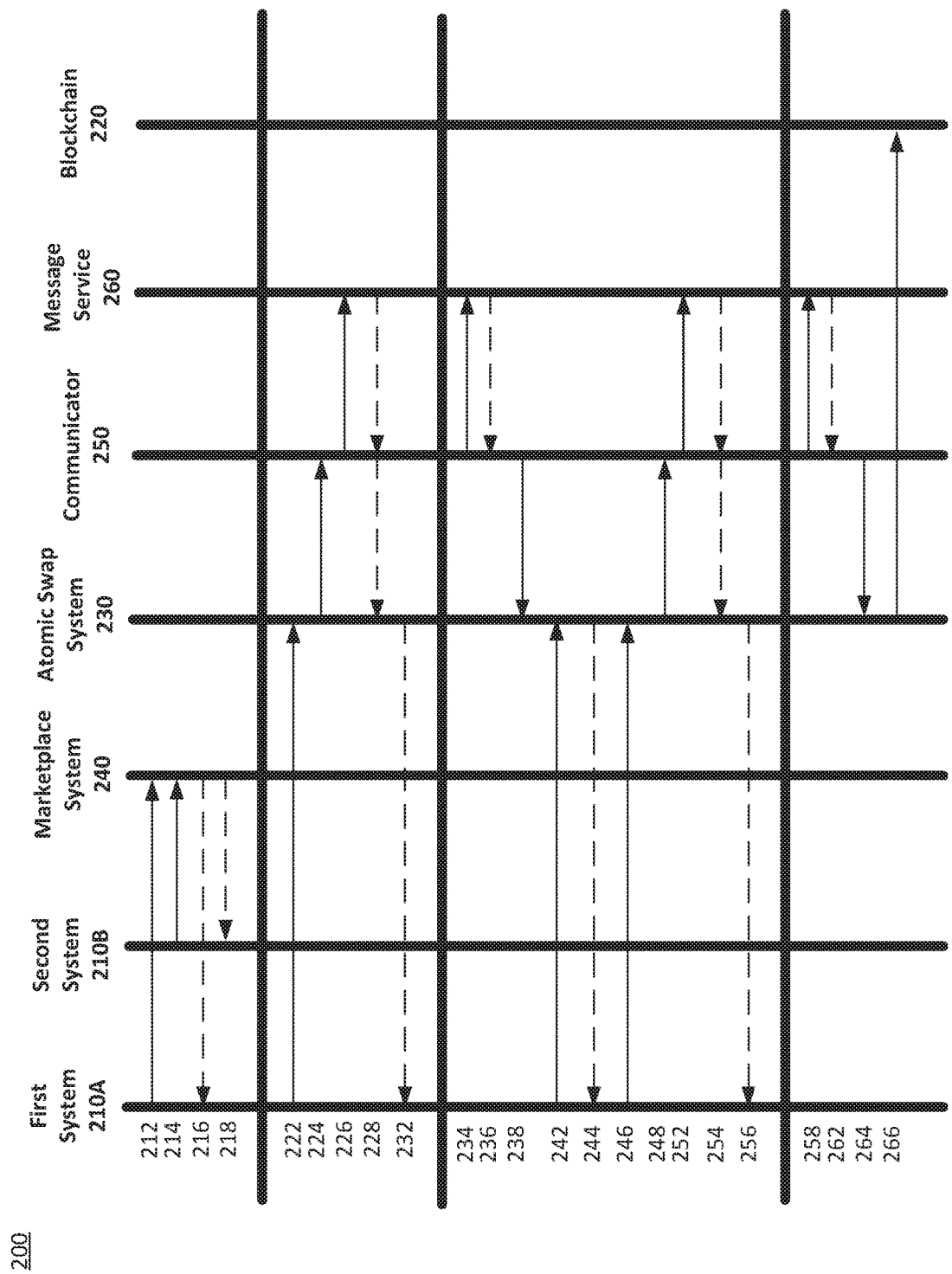
FIG. 2 depicts a flow diagram illustrating a flow for performing an atomic swap, according to some embodiments.

FIG. 2 depicts a flow diagram illustrating a flow 200 for performing an atomic swap, according to some embodiments. The flow 200 may include a first system 210A and a second system 210B configured to perform a transaction similar to transaction systems 110A and 110B as described with reference to FIG. 1A.

First system 210A and second system 210B may perform a setup stage at 212 through 218. At 212, first system 210A may access marketplace system 240, and at 214, second system 210B may also access marketplace system 240. These operations may include generating, negotiating, offering, counteroffering, and/or accepting transaction terms. At 216 and 218, first system 210A and second system 210B may signify an agreement to the transaction terms. First system 210A and second system 210B may then have possession of transaction parameters such as a transaction identification, terms related to the expiration of the deal, the other party's payment address, the other party's mailbox identification, and/or both parties' desired asset types and/or quantities. An asset identification value may correspond to the asset types.

At 222-232, the first system 210A and second system 210B may generate ZKPs and/or asset notes indicating that they have possession of, and are committing, the assets requested by the other party. Atomic swap system 230 may generate the ZKPs. At 222 the first system 210A and/or second system 210B may provide the transaction parameters to atomic swap system 230. In particular, the deal parameters may indicate what each system 210 has requested in the asset transaction. Using the parameters, atomic swap system 230 may generate one or more unsigned transfer transactions. The unsigned transfer transaction may include a ZKP and/or an asset indicating which assets and/or asset quantities a party has committed to a transaction. These assets and/or asset quantities may adhere to the term of the transaction agreed upon during the setup phase at 216 and 218. In this case, a first unsigned transfer transaction may be generated for first system 210A and a second unsigned transfer transaction may be generated for second system 210B. Along with generating the unsigned transfer transactions, atomic swap system 230 may also generate corresponding unsigned transaction metadata that is private. This metadata may be used to sign the unsigned transaction. Atomic swap system 230 may save the unsigned transfer transactions and/or the metadata in a database.

Atomic swap system 230 may encrypt the unsigned transfer transactions including the ZKPs. This encryption may occur using the a public key corresponding to the first system 210A or the second system 210B. For example, a ZKP indicating that the first system 210A has committed an asset and/or asset quantities to a transaction may be encrypted using a key corresponding to second system 210B. Atomic swap system 230 may also perform this encryption for assets and/or asset quantities committed by second system 210B. At 224, atomic swap system 230 may use communicator 250 to apply communication protocols so that the encrypted ZKP may be delivered to the corresponding recipient. Message service 260 may perform this delivery at 226 for each encrypted ZKP. At 228, message service 260 may provide atomic swap system 230 with an acknowledgement receipt indicating that the encrypted ZKPs have been delivered to their respective system recipients. Message service 260 may use the mailbox identifications provided from first system 210A and second system 210B provided during the setup phase. Atomic swap system 230 may then save update the data corresponding to the transaction and/or optionally provide an updated transaction identification to first system 210A and/or second system 210B at 232.

Throughout the process where atomic swap system 230 is generating the encrypted ZKPs and after delivery, communicator 250 may perform an ongoing polling of message service 260 to determine if any responses have been received at 234-238. At 234, communication may query message service 260 for any pending messages and retrieve the pending messages at 236. Communicator 250 may deliver any received messages to atomic swap system 230.

While this polling may be occurring, first system 210A and second system 210B may have received encrypted ZKPs sent from atomic swap system 230. In an embodiment, first system 210A and/or second system 210B may poll atomic swap system 230 to retrieve these encrypted ZKPs and/or to view other pending offers at 242-244. In an embodiment, first system 210A and/or second system 210B may receive the encrypted ZKPs from message service 260.

Upon receiving the encrypted ZKPs, first system 210A and/or second system 210B may decrypt the received transaction using their corresponding key. The systems 210 may then perform a verification of ZKP to determine that the other party has committed the requested assets and/or asset quantities to the transaction. Upon verifying the ZKP, the first system 210A and/or second system 210B may transmit a command confirming the offer to atomic swap system 230 at 246.

Atomic swap system 230 may then retrieve the saved unsigned transaction from the database and apply a signature to the transaction. Atomic swap system 230 may save the signed transaction to the database. Atomic swap system 230 may then encrypt the confirmation message and signature using the public key corresponding to the other party and send the encrypted signature to the other party at 248 and 252 using communicator 250 and message service 260. The delivery of the confirmation message may be confirmed by message service 260 at 254 and atomic swap system 230 may optionally provide an updated transaction identification to first system 210A and/or second system 210B. The delivery of the signed confirmation message to each party may indicate that each party has confirmed their respective ZKPs and that the transaction may be executed.

At 258-262, atomic swap system 230 may optionally perform a polling similar to 234-238 on behalf of first system 210A or second system 210B. This polling may have been to determine when a party has provided a signed confirmation message indicating that the ZKP has been verified. For example, if atomic swap system 230 is a node corresponding to first system 210A and second system 210B performs its own signing of the confirmation message, atomic swap system 230 may perform a polling to determine when the signed confirmation message is received from the second system 210B or another atomic swap system 230 corresponding to second system 210B.

The confirmation message retrieved may correspond be encrypted using a key corresponding to the first system 210A and may be subsequently decrypted at atomic swap system 230. Atomic swap system 230 may then retrieve the transaction information stored in the database and finalize the transaction. The transaction may be performed as an atomic swap that may be signed by one or more signatures corresponding to first system 210A and second system 210B. At 266, atomic swap system 230 may broadcast or commit the transaction to blockchain 220.

Figure 3:
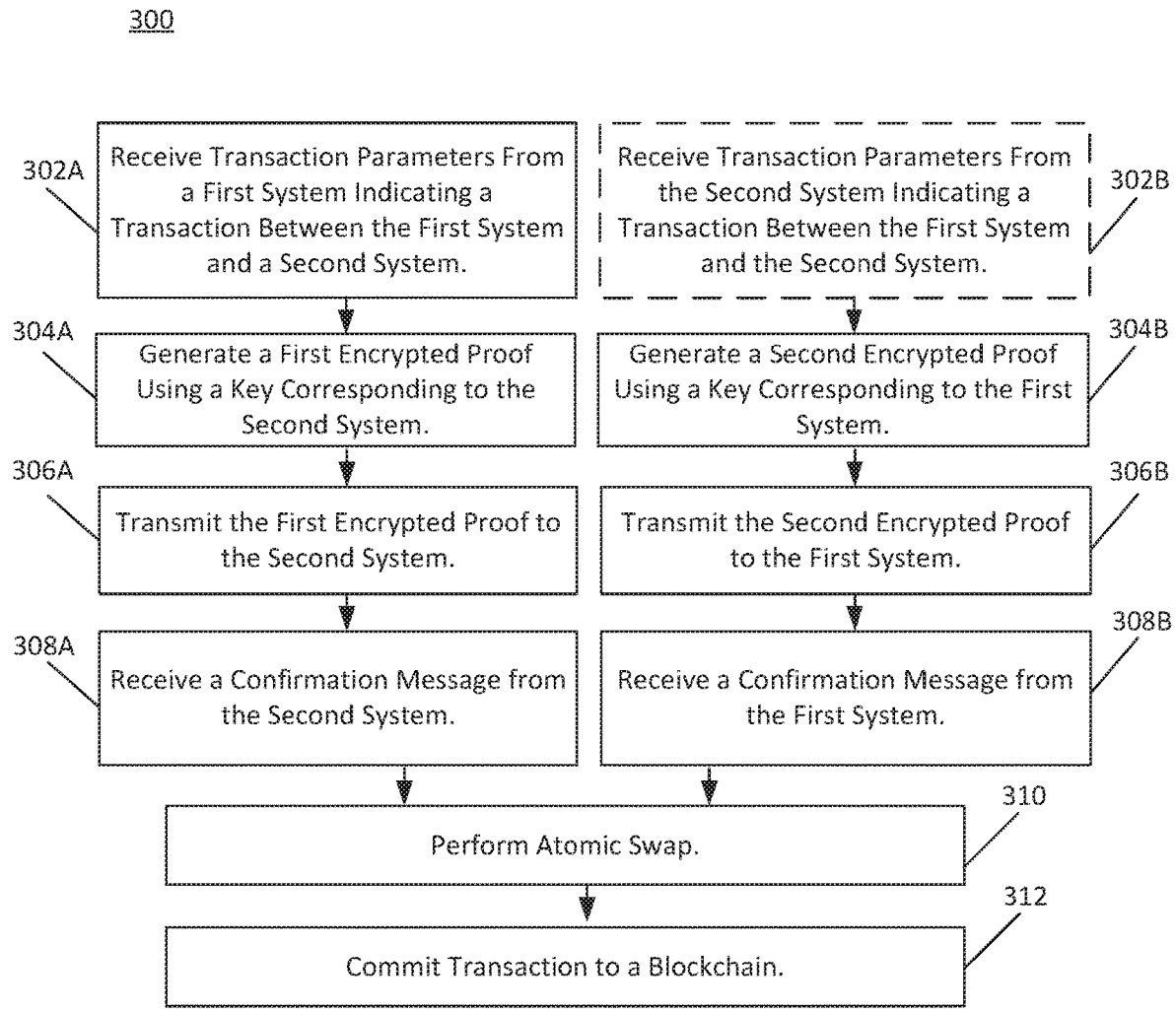
FIG. 3 depicts a flowchart illustrating a method for performing an atomic swap using an atomic swap system, according to some embodiments.

FIG. 3 depicts a flowchart illustrating a method 300 for performing an atomic swap using an atomic swap system, according to some embodiments. Method 300 shall be described with reference to FIG. 1A; however, method 300 is not limited to that example embodiment.

In an embodiment, atomic swap system 130 may utilize method 300 to generate a execute a transaction. While method 300 is described with reference to atomic swap system 130, method 300 may be executed on any computing device, such as, for example, the computer system described with reference to FIG. 5 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 3, as will be understood by a person of ordinary skill in the art.

At 302A, atomic swap system 130 may receive transaction parameters from a first system indicating transaction between the first system and a second system. The first system may correspond to transaction system 110A while the second system may correspond to transaction system 110B. The transaction parameters may include an identification or ID identifying the deal or transaction, a parameter indicating conditions that would cause a termination of the deal, the second party's payment address, the second party's mailbox identification (such as a topic or a queue), the first party's desired asset type, value, and/or quantity, and/or the second party's desired asset type, value, and/or quantity. At 302B, atomic swap system 130 may optionally receive the transaction parameters from the second system as well. This redundancy may allow for enhanced security and confirmation of the terms of the transaction.

At 304A, atomic swap system 130 may generate a first encrypted proof using a key corresponding to the second system. Atomic swap system 130 may generate a ZKP using the parameters provided the first system to indicate that the first system has committed the particular assets and/or asset quantities requested by the second system. The ZKP may be generate independent from the assets provided and/or by identifying the provided assets. For example, if a transaction requires that the first system commit $100, but the first system commits $92, atomic swap system 130 may generate a ZKP indicating that the first system has committed $92. In this manner, the second system may recognize that the first system has not truly committed the agreed upon $100. In an embodiment, atomic swap system 130 may halt the process upon recognizing that the first system has not committed the requested asset. In this case, atomic swap system 130 may not generate the ZKP and instead request that the first system commit the requested asset.

After generating the ZKP, atomic swap system 130 may using a key corresponding to the second system to encrypt the proof. This first encrypted proof may then only be decrypted by the second system and provide security to the atomic swap process. At 304B, atomic swap system 130 may generate a second encrypted proof using a key corresponding to the first system. This may occur in a similar manner to 304A and may allow the first system to verify that the second system is committing the assets or asset quantities requested by the first system.

At 306A, atomic swap system 130 may transmit the first encrypted proof to the second system. At 306B, atomic swap system 130 may transmit the second encrypted proof to the first system. The respective systems may then decrypt the proofs and verify the proofs to confirm that the requested asset is being committed to the transaction by the other system.

At 308A, atomic swap system 130 may receive a confirmation message from the second system. At 308B, atomic swap system 130 may receive a confirmation message from the first message. These confirmation messages may indicate that the respective proofs have been verified. Atomic swap system 130 may optionally sign and/or encrypt these confirmation message and transmit the confirmation messages to the other systems to inform them that the other system has confirmed the proof. That is, the confirmation message received from the second system may be signed either by the second system or atomic swap system 130 and be transmitted to the first system in an encrypted manner using a key corresponding to the first system.

At 310, in view of the confirmation message, atomic swap system 130 may perform an atomic swap. The atomic swap may be a simultaneous or near-simultaneous exchange of the committed assets. The exchange occurring at 310 may be the first time that the assets are locked and transferred. In this manner, the assets may not have been locked or committed to an escrow. At 312, the transaction may be committed to a blockchain 120.

Figure 4:
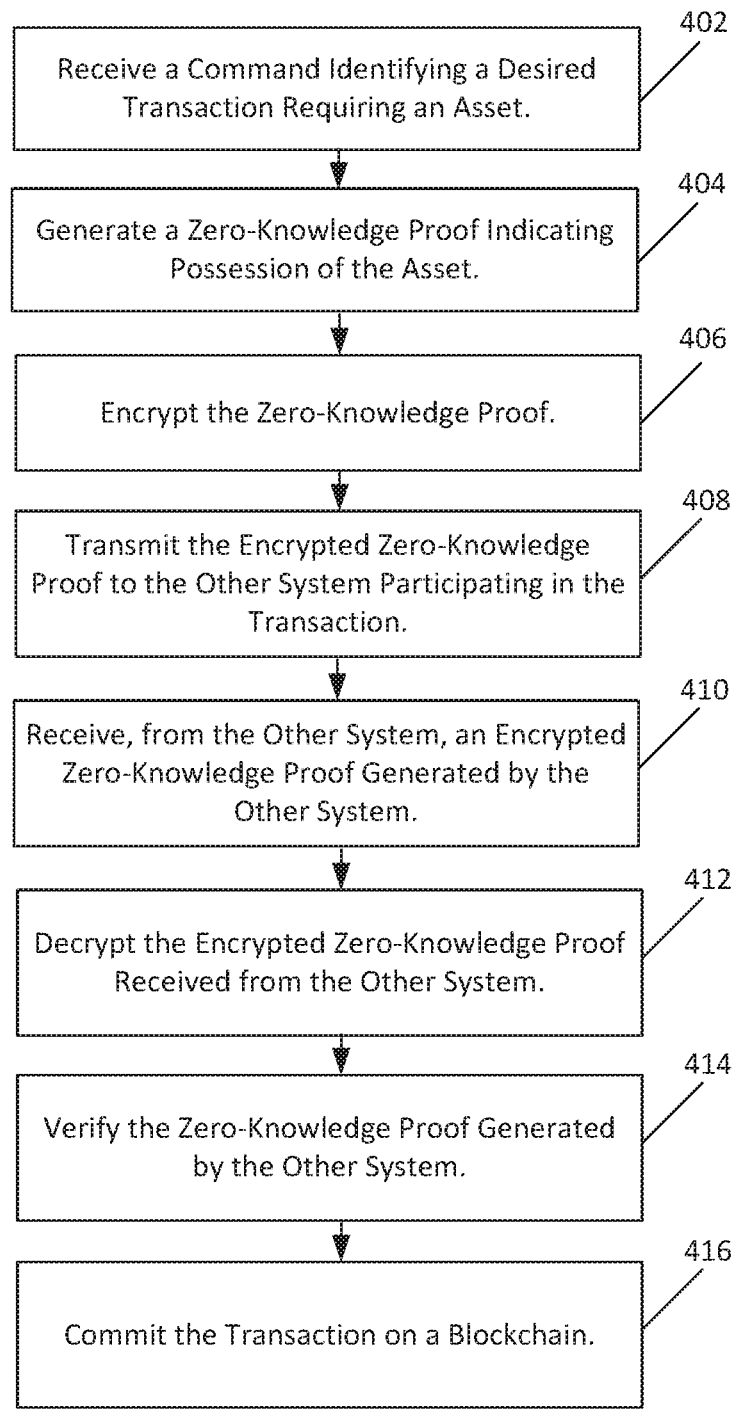
FIG. 4 depicts a flowchart illustrating a method for executing a transaction, according to some embodiments.

FIG. 4 depicts a flowchart illustrating a method 400 for executing a transaction, according to some embodiments. Method 400 shall be described with reference to FIG. 1B and FIG. 1C; however, method 400 is not limited to that example embodiment.

In an embodiment, transaction system 110A and/or atomic swap system 130A may utilize method 400 to generate a execute a transaction. While method 400 is described with reference to transaction system 110A and atomic swap system 130A, method 400 may be executed on any computing device, such as, for example, the computer system described with reference to FIG. 5 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 4, as will be understood by a person of ordinary skill in the art.

At 402, transaction system 110A and/or atomic swap system 130A corresponding to transaction system 110A may receive a command identifying a desired transaction requiring an asset. For example, transaction system 110A may receive a command from a user and/or from communicating with transaction system 110B. Similarly, atomic swap system 130A may receive a command from transaction system 110A. The command may identify a requested asset requested by transaction system 110B or atomic swap system 130B. In this manner, the desired asset or asset quantity from the other party may be identified.

At 404, transaction system 110A and/or atomic swap system 130A may generate a zero-knowledge proof indicating possession of the asset. The ZKP may indicate identify the terms of the transaction including the requested asset from transaction system 110B and/or atomic swap system 130B. This requested asset may be committed to the transaction and the ZKP may signify that the requested asset has been committed.

At 406, transaction system 110A and/or atomic swap system 130A may encrypt the ZKP. The ZKP may be encrypted using a key corresponding to transaction system 110B and/or atomic swap system 130B. At 408, transaction system 110A and/or atomic swap system 130A may transmit the encrypted ZKP to the other system participating in the transaction. For example, the other system may be transaction system 110B and/or atomic swap system 130B. The other system is then able to decrypt the encrypted ZKP using their own key. The other system is also able to verify the ZKP and to confirm that transaction system 110A has committed the agreed-upon assets or asset quantities to the transaction.

At 410, transaction system 110A and/or atomic swap system 130A may receive, from the other system, an encrypted ZKP generated by the other system. For example, transaction system 110B and/or atomic swap system 130B may have generated a ZKP indicating that transaction system 110B has committed the assets and/or asset quantities requested by transaction system 110A. Transaction system 110B and/or atomic swap system 130B may have encrypted the ZKP using a key corresponding to transaction system 110A and/or atomic swap system 130A.

At 412, transaction system 110A and/or atomic swap system 130A may decrypt the encrypted ZKP received from the other system. To decrypt the encrypted ZKP, transaction system 110A and/or atomic swap system 130A may use a corresponding key.

At 414, transaction system 110A and/or atomic swap system 130A may verify the ZKP generated by the other system. This verification may include testing the ZKP so that an expected result is returned. In an embodiment, this verification may include recomputing a hash value to determine that the correct assets and/or asset quantity have been committed. If the result of the verification function is an expected result in view of the requested assets, then transaction system 110A and/or atomic swap system 130A is able to confirm that transaction system 110B has committed the requested asset and/or asset quantity to the transaction. After verifying the ZKP, transaction system 110A and/or atomic swap system 130A may optionally transmit a confirmation message to transaction system 110B and/or atomic swap system 130B to indicate that the transaction has been confirmed.

At 416, transaction system 110A and/or atomic swap system 130A may commit the transaction on a blockchain 120. In an embodiment, transaction system 110A and/or atomic swap system 130A may commit the transaction after receiving a confirmation from the other system indicating that the other system has verified the ZKP generated by transaction system 110A and/or atomic swap system 130A. Committing the transaction may include signing the transaction with a signature corresponding to transaction system 110A and/or transaction system 110B. Transaction system 110A and/or atomic swap system 130A may then commit the transaction to blockchain 120.

Figure 5:
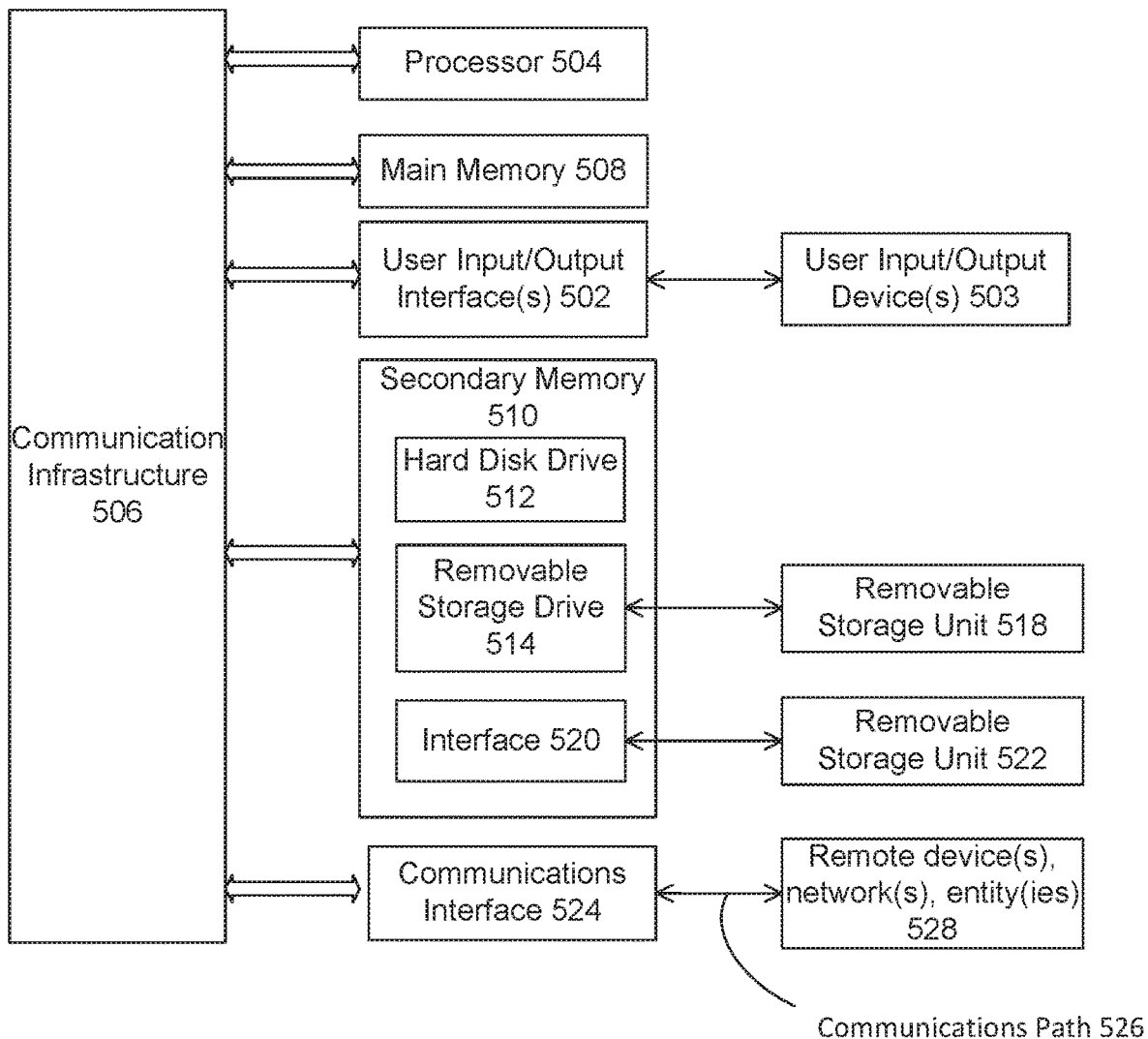
FIG. 5 depicts an example computer system useful for implementing various embodiments.

FIG. 5 depicts an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
    receiving a command identifying a proposed transaction between a first and a second system, the proposed transaction being an exchange of a first asset with a second asset, wherein the first system has requested to receive the second asset in exchange for the first asset and the second system has requested to receive the first asset in exchange for the second asset;
    generating a first zero-knowledge proof proving that the first system is able to transfer the first asset;
    encrypting a first message including the first zero-knowledge proof, the encryption occurring with a first key such that only the second system can read the first message;
    transmitting, to the second system, the first message, wherein a second encrypted message is generated, the second encrypted message including a second zero-knowledge proof proving that the second system is able to transfer the second asset, wherein the second message is encrypted by a second key such that only the first system can read the second message, and wherein transmitting the first message to the second system is a non-locking operation that allows the first asset to be available;
    receiving a confirmation message from the second system indicating that the second system has verified the first zero knowledge proof; and in response to receiving the confirmation message and verification of the second zero-knowledge proof, executing the proposed transaction.

2. The computer-implemented method of claim 1, further comprising:
committing the proposed transaction to a blockchain.

3. The computer-implemented method of claim 1, wherein the first proof indicates that the first system has title to an asset.

4. The computer-implemented method of claim 1, wherein executing the proposed transaction further comprises:
performing an atomic swap.

5. The computer-implemented method of claim 4, wherein the atomic swap is a single transaction.

6. The computer-implemented method of claim 1, wherein the first system and the second system communicate in a decentralized configuration.

7. The computer-implemented method of claim 1, wherein the first asset or the second asset is a cryptocurrency.

8. A first system, comprising:
a memory; and
at least one processor coupled to the memory and configured to:
receive a command identifying a proposed transaction between the first system and a second system, the proposed transaction being an exchange of a first asset with a second asset, wherein the first system has requested to receive the second asset in exchange for the first asset and the second system has requested to receive the first asset in exchange for the second asset;
generate a first zero-knowledge proof proving that the first system is able to transfer the first asset;
encrypt a first message including the first zero-knowledge proof, the encryption occurring with a first key such that only the second system can read the first message;
transmit, to the second system, the first message, wherein a second encrypted message is generated, the second encrypted message including a second zero-knowledge proof proving that the second system is able to transfer the second asset, wherein the second message is encrypted by a second key such that only the first system can read the second message, and wherein transmitting the first message to the second system is a non-locking operation that allows the first asset to be available;
receive a confirmation message from the second system indicating that the second system has verified the first zero knowledge proof; and
in response to receiving the confirmation message and verification of the second zero-knowledge proof, execute the proposed transaction.

9. The first system of claim 8, wherein the at least one processor is further configured to:
commit the proposed transaction to a blockchain.

10. The first system of claim 8, wherein the first proof indicates that the first system has title to an asset.

11. The first system of claim 8, wherein to execute the proposed transaction, the at least one processor is further configured to:
perform an atomic swap.

12. The first system of claim 11, wherein the atomic swap is a single transaction.

13. The first system of claim 8, wherein the first system communicates with the second system in a decentralized configuration.

14. The first system of claim 8, wherein the first asset or the second asset is a cryptocurrency.

15. A non-transitory computer-readable device having instructions stored thereon that, when executed by at least one computing device, cause the at least one computing device to perform operations comprising:
receiving a command identifying a proposed transaction between a first and a second system, the proposed transaction being an exchange of a first asset with a second asset, wherein the first system has requested to receive the second asset in exchange for the first asset and the second system has requested to receive the first asset in exchange for the second asset;
generating a first zero-knowledge proof proving that the first system is able to transfer the first asset;
encrypting a first message including the first zero-knowledge proof, the encryption occurring with a first key such that only the second system can read the first message;
transmitting, to the second system, the first message, wherein a second encrypted message is generated, the second encrypted message including a second zero-knowledge proof proving that the second system is able to transfer the second asset, wherein the second message is encrypted by a second key such that only the first system can read the second message;
receiving a confirmation message from the second system indicating that the second system has verified the first zero knowledge proof; and
in response to receiving the confirmation message and verification of the second zero-knowledge proof, executing the proposed transaction,
wherein the operations perform an atomic swap as a single transaction to avoid locking the first asset.

16. The non-transitory computer-readable device of claim 15, the operations further comprising:
committing the proposed transaction to a blockchain.

17. The non-transitory computer-readable device of claim 15, wherein the first asset or the second asset is a cryptocurrency.

* * * * *